United States Patent [19]

Bird

[11] Patent Number: 4,979,417

[45] Date of Patent: Dec. 25, 1990

[54] ROTATING SAW BLADE HAVING IMPROVED CRITICAL VIBRATIONAL SPEED

[75] Inventor: Warren M. Bird, Berkeley, Calif.

[73] Assignee: California Saw & Knife Works, San Francisco, Calif.

[21] Appl. No.: 406,643

[22] Filed: Sep. 13, 1989

[51] Int. Cl.$^5$ ............................................. B27B 33/08
[52] U.S. Cl. ...................................................... 83/835
[58] Field of Search ............................... 83/835–841, 83/846, 847, 848, 852, 853, 855

[56] References Cited

U.S. PATENT DOCUMENTS

| | | | |
|---|---|---|---|
| 334,440 | 1/1886 | Ireland | 83/835 |
| 614,053 | 11/1898 | Johnson | 83/838 |
| 640,279 | 1/1900 | Dickerson | 83/838 |
| 1,689,618 | 10/1928 | Brown | 83/835 |
| 4,157,673 | 6/1979 | Bruno | 83/855 |

FOREIGN PATENT DOCUMENTS

| | | | |
|---|---|---|---|
| 927553 | 11/1947 | France | 83/835 |
| 570917 | 7/1945 | United Kingdom | 83/835 |

Primary Examiner—Frank T. Yost
Assistant Examiner—Scott A. Smith
Attorney, Agent, or Firm—Townsend and Townsend

[57] ABSTRACT

A circular saw utilized for ripping lumber (or cutting any other work piece material) is provided with a step taper construction. The step taper construction occurs between concentric circular members of decreasing thickness to the periphery of the saw, this construction raising critical rotational speeds to enable lower saw kerf or greater operating speeds of the saw. The saw includes a thick central concentric hub member having a thickness greater than that of the cutting path or kerf of the saw. An intermediate concentric member begins at a step taper at the concentric hub and extends the radial distance from the hub to the saw periphery. Intermediate radial member typically extends into the kerf of the saw at a diameter less than the kerf and has a thickness less than that of the kerf. An exterior tooth supporting concentric member of the saw extends from the intermediate concentric member to the supported saw teeth on the exterior of the saw. This final exterior tooth supporting concentric member commences from a second step taper at the exterior of the intermediate concentric member and has a thickness less than that of the intermediate concentric member. It is common, but not required, that the disclosed step taper construction be in combination with conventional prestressing of the saw, such as that produced by symmetrical stressing or asymmetrical stressing.

5 Claims, 3 Drawing Sheets

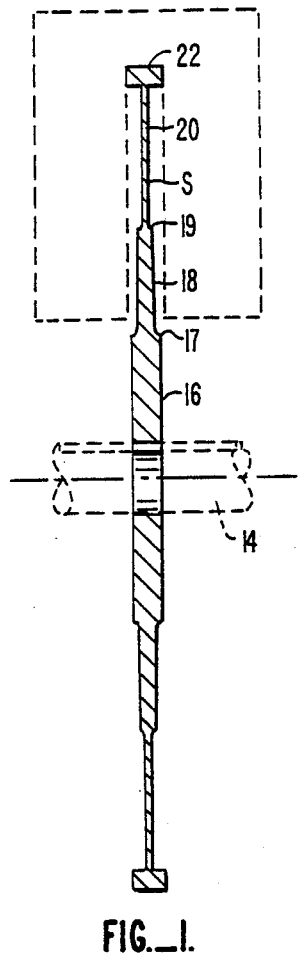
FIG._1.
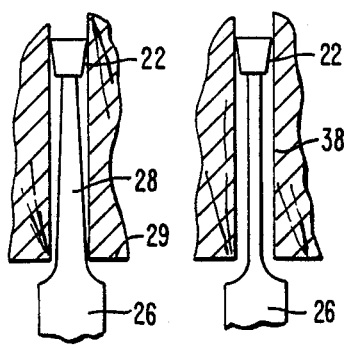
FIG._2A. PRIOR ART  FIG._2B. PRIOR ART
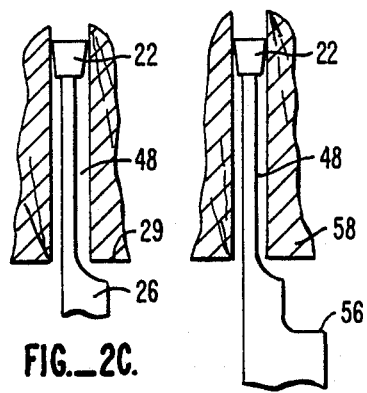
FIG._2C. PRIOR ART  FIG._2D. PRIOR ART
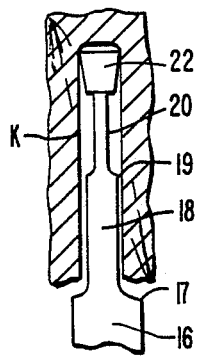 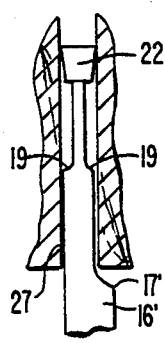 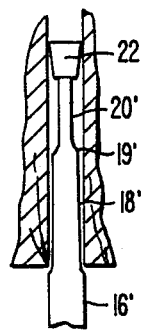 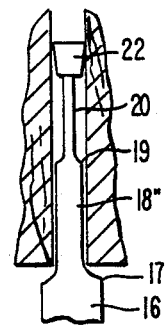 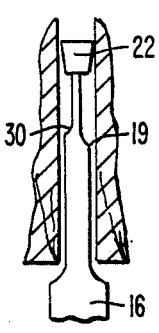
FIG._3A.  FIG._3B.  FIG._3C.  FIG._3D.  FIG._3E.

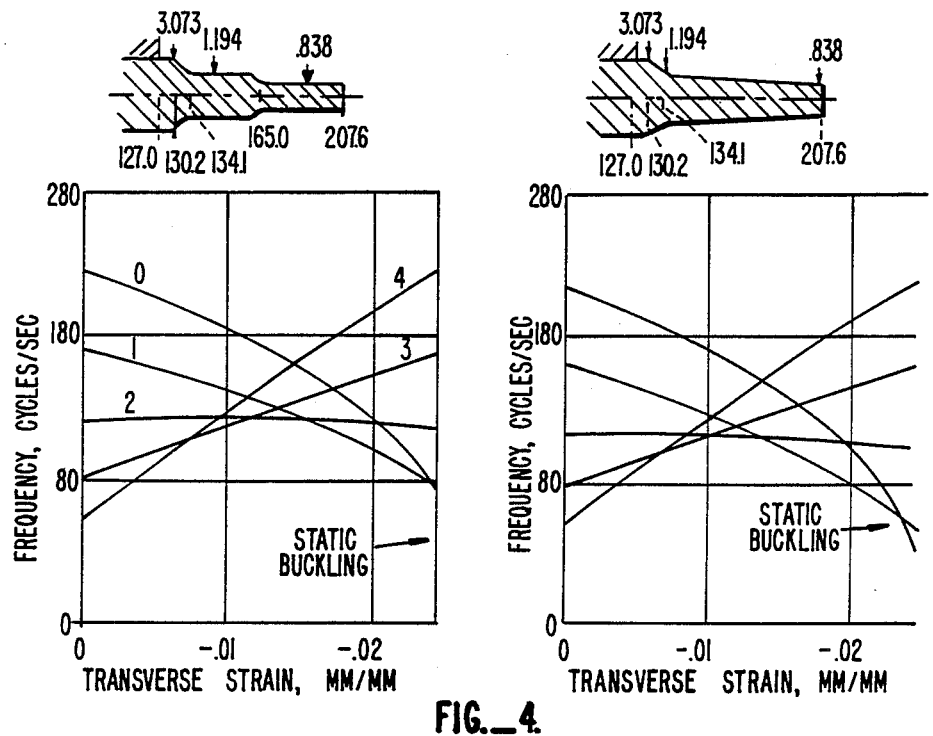
FIG._4.
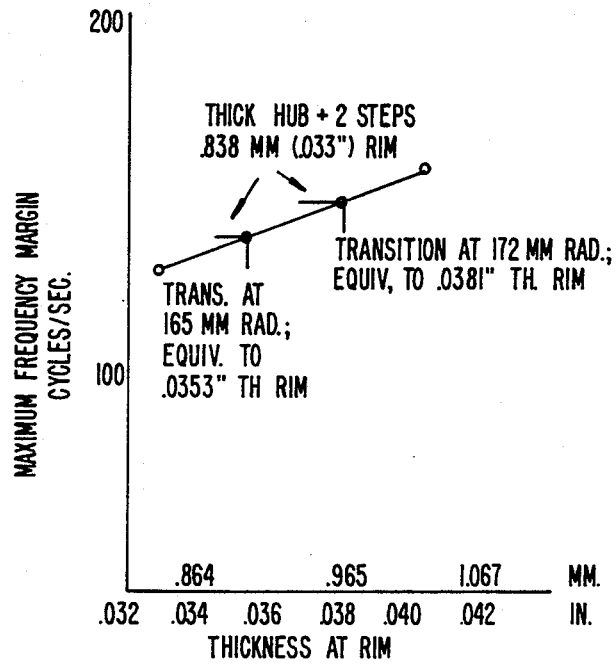
FIG._5.

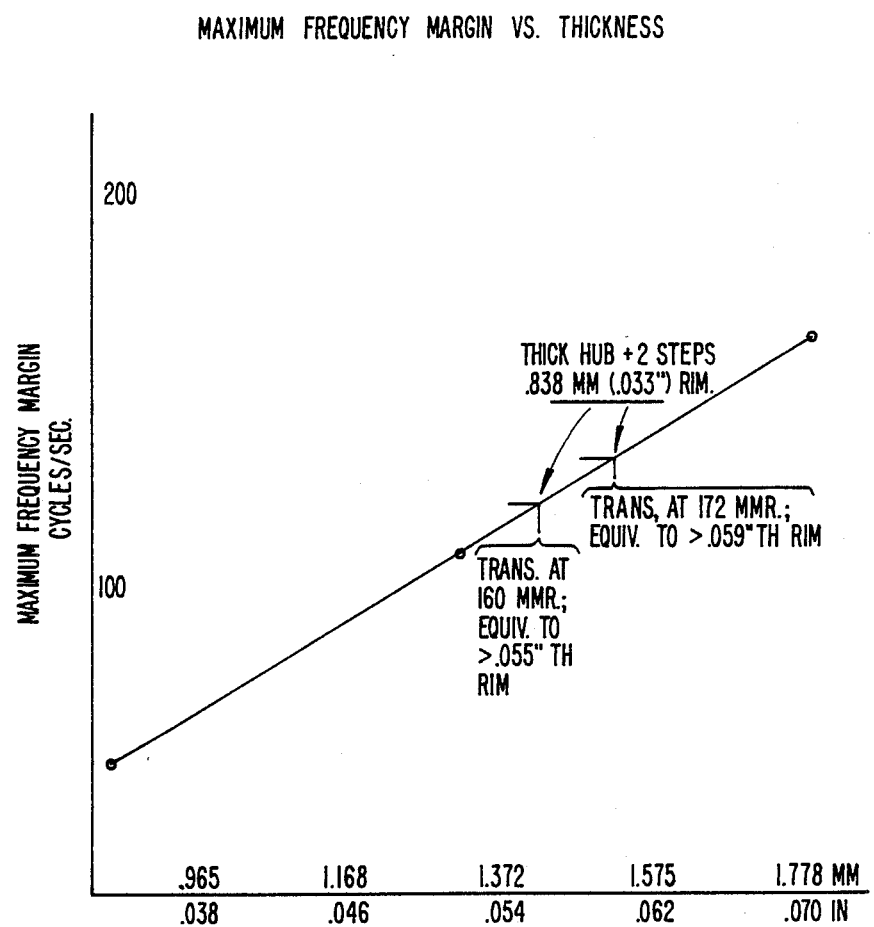
FIG._6.

ROTATING SAW BLADE HAVING IMPROVED CRITICAL VIBRATIONAL SPEED

This invention relates to circular saws. More particularly a saw construction for holding peripheral cutting teeth is disclosed. The saw construction includes a thick central concentric hub member, a thinner intermediate concentric member and a final thinnest peripheral member supporting the cutting teeth. The concentric members are integrally connected at step tapers. The construction raises the critical speed of the saw enabling greater operating speeds or reduced saw thickness and saw kerf.

STATEMENT OF THE PROBLEM

Lumber mills typically use one or more circular saws affixed to a common rotating shaft. These saws cut or rip logs with the grain for division of the log into conventional boards.

Such saws have two critical operating features which constitute conflicting requirements. These conflicting requirements must be balanced for maximum cutting efficiency.

First, it is preferred that the saw used for cutting have a small cutting path or kerf. That is to say the sawed slot or kerf left in the wake of the saw as the lumber moves through the saw must be of minimal dimension. The reason for this minimal dimension is that the kerf constitutes waste. The less waste generated in the form of sawdust, the more efficient the mill.

Second, the saws must cut in an intended (and usually straight) path. Departures from a straight path lead to further inefficiencies. As an example of these inefficiencies, the case of cutting a so-called 2×4 can be used as an example. Such a 2×4 is commonly a section of lumber 2 inches by 4 inches. In actual fact, the 2 inch dimension must have a minimum required thickness of not less 1.500 inches. If a piece of lumber is cut so that anywhere along its length it has a dimension less than the required 1.500 inches, it is rejected. Typically the piece must be resawn at great waste to a board of smaller dimension. To minimize waste, boards are cut close to, but not under, the required minimum dimension. It will be appreciated that these considerations of minimum dimension must also take into account drying and planing where required.

The requirements that the saw be of thin dimension to produce a narrow kerf and yet cut in a straight line work against each other. Thin saws are more subject to vibration because they have lower critical rotation speeds. When thin saws reach their critical vibrational tendencies at critical speed, the saw loses resistance to lateral forces and no longer cuts in a straight line. Instead, the saw cuts in a non-straight or waved line. In the case of the 2×4, part of the piece of cut lumber along its length would intrude beyond the required 1.500 inches.

On the other hand, thick saws generate too much waste. Accordingly, a compromise of these conflicting requirements is necessary.

Some explanation of how saws vibrate can be helpful. Typically saws vibrate with respect to nodes—points along the diameter of the saw which remain relatively stationary. The saw between the nodes visibly undergoes excursion.

These nodes are referred to by the number of diametrically opposite points along which vibration of the saw occurs. The node typically remains nearly stationary during vibration. The portion of the saw between the nodes undergoes vibrational motion.

The vibration of saws is typically described in terms of the modes of vibration. The first mode is a vibration which typically occurs along diameters at or near 180°. The second mode occurs at angular intervals of 90°, the third at intervals of 60°, etc. The so-called "zero" mode occurs when the vibration causes the saw to become concave and convex.

When a saw undergoes vibration while cutting, vibration is typically excited at the critical speed by any stationary or low frequency force. Most typically this symmetrical or nonsymmetrical force is that of the piece of lumber being cut.

From the point of saw excitation, waves of vibration propagate along the circumference of the saw. Some waves of vibration propagate forward and in the cutting direction of the saw. Other waves of vibration propagate rearwards and opposite to the rotation of the saw. It is these rearward propagating waves that constitute the major vibrational problem.

When these backward traveling (rearward propagating) waves reach a circumferential speed that is equal and opposite to the rotational speed of the saw, a critical speed is reached. At the critical speed, a serious degradation of the linear cutting characteristics of the saw occurs.

The backward traveling waves contributing to the degradation a saw performance may combine, especially in the case of saws that are not rigidly clamped. That is several of the different vibration modes may add, one to another, to produce the total vibration excursion.

The reader will understand that the effects of vibration at the critical speed are not merely confined to a lack of linearity of cut and reduced operational speeds. Typically, the teeth supporting surfaces make excursions to the sides of the kerf. Rapid heating of the saw occurs due to rubbing against the side of the kerf. Complete saw failure can follow.

An excellent technical summation of saw vibration can be found in Mote, C. D. Jr., "Free Vibration of Initially Stressed Circular Discs," J. Engrg. for Industry, Trans ASME. vol. 87, no. 2, pp 258–264, May 1965. This summary, adapted to the problem of saw vibration in this application is paraphrased in the following two paragraphs.

The rotation speed, $\Omega$, of centrally clamped, peripherally free circular plates, such as saw blades, is limited by a resonance excited by a constant, stationary, lateral force. This resonance condition occurs when the backward traveling wavespeed vanishes, or $$\frac{\omega_{mn}}{n} - \Omega = 0$$

where $\omega_{mn}$ is the natural frequency of the m nodal circle, n nodal diameter mode. The lowest rotation speed at which this resonance occurs is called the "critical speed", and the resonant mode is the "critical mode". The critical mode is typically one of zero nodal circles and a nodal diameter number between two and six. This critical speed appears to be a severe limitation on the stable operation of the plate.

Increasing the natural frequencies of the potentially unstable modes extends the range of stable rotation speed, or, alternatively, permits the use of thinner plates with unchanged rotation speed. For saw blades the increased natural frequencies lead to higher quality cuts and increased feed rates as well as reduced material losses through use of thinner blades.

A commonly used method of increasing the natural frequency of the potentially unstable modes involves introduction of in-plane stress into the plate. Substantial in-plane stress can change vibration characteristics dramatically. One initial stressing technique, applied to saw blades, is the rolling of a thin axisymmetric ring with sufficient rolling pressure to induce plastic deformation and a residual stress field into the plate. This method is referred to as "roll tensioning". This process typically increases the natural frequencies associated with modes of three nodal diameters and higher and decreases the zero and one nodal diameter natural frequencies. With sufficient rolling effort, the zero nodal diameter natural frequency is driven to zero and divergence buckling of the plate occurs. If the plate is under-tensioned the natural frequency of the critical mode is not increased to the extent possible; if the plate is over-tensioned divergence instability occurs.

SUMMARY OF THE PRIOR ART

Circular saws having a thick central hub with a constant and gradually tapered member extending from the hub to the tooth supporting periphery of the saw are known. Typically the tapered member has a relatively broad section adjacent the thick central concentric hub. This tapered member tapers to a narrow tooth supporting section immediately adjacent the supported teeth.

Circular saws having a thick central hub with a narrow dimension of constant thickness extending from the central and concentric hub to the supported teeth are also known. Likewise it is known to change the configuration of the hub to accommodate other parts of the saw assembly.

Circular saws having a step taper outside of the kerf from a thick central member are known. These saws have the step taper at the hub only on one side. The saws are flat on the remaining side. This flatness extends from the hub all the way to and through the tooth supporting surface along one side of the saw. Such saws are typically used in special sawing operations, such as the cutting of boards from the side of a log to "square" its surfaces for further processing. (See FIG. 2D).

It is to be understood that circular saws when undergoing rotation for cutting are affected by the stresses within the saw disk. These stresses originate from centrifugal forces. These centrifugal forces produce radial stresses which are tensile and hoop stresses which are tensile. At the same time and typically near the circumference of the saw, compressive hoop stresses are generated when the saws are subject to heating during cutting. Compressive hoop stresses can produce drastic reduction of the critical speeds associated with the vibration modes having three or more nodal diameters.

It is known that circular saws can have prestressing induced to their outer zone. Such prestressing can include a circumferential cold rolling of the saw body (or some other process) to induce hoop tension. This hoop tension is generally opposite to the induced hoop compression encountered during cutting.

When a prestressed saw undergoes heating responsive to cutting, the prestressed portions of the saw act opposite to those stresses induced by heating. This maintains critical speeds at an elevated level enabling the saw to operate at higher speeds with linear cutting. Typically such prestressing is most effective against third order and higher nodal vibrations incorporated in the saw.

It is also known that so-called asymmetrical radial stressing may also be induced in saw blades. Again, the manufactured saw is cold rolled or otherwise prestressed—this time along selected radial dimensions or at discrete points. This type of treatment also induces stresses opposite to the effects of saw heating which induces hoop compression. Critical rotational speeds are again maintained at an elevated level, enabling higher operating speeds with linear cutting.

DISCOVERY

I have discovered that in a saw with a thick concentric central hub portion (greater than the thickness of the cutting path or kerf) and a supported peripheral tooth portion that a step taper provided between the central hub portion and the supported teeth provides improved critical frequency performance results. This is believed to emanate from an elevation of the energy required to bend the saw disk into the shapes associated with certain modes of vibration.

SUMMARY OF THE INVENTION

A circular saw utilized for cutting lumber (or any other workpiece material) is provided with a step taper construction. The step taper construction occurs between concentric circular members of decreasing thickness to the periphery of the saw, this construction raising critical rotational speeds to enable the use of smaller saw kerf or greater operating speeds of the saw. The saw includes a thick central concentric hub member having a thickness greater than that of the cutting path or kerf of the saw, and preferably 1.5 times that of the cutting path or kerf of the saw. An intermediate concentric member begins at a step taper at the concentric hub and extends the radial distance from the hub to the saw periphery. The intermediate radial member typically extends into the kerf of the saw at a diameter less than the outer diameter of the saw plate (or) diameter of the peripheral supporting teeth and has a thickness less than that of the kerf. An exterior tooth supporting concentric member of the saw extends from the intermediate concentric member to the supported saw teeth on the exterior of the saw. This final exterior tooth supporting concentric member commences from a second step taper at the exterior of the intermediate concentric member and has a thickness less than that of the intermediate concentric member. It is common, but not required, that the disclosed step taper construction be in combination with conventional prestressing of the saw, such as that produced by symmetrical stressing or asymmetrical stressing.

Other Objects, Features, and Advantages

An object to this invention is to disclose the use of a step taper in a saw with a thick central hub. Preferably, the step taper is located between the thick central hub and the tooth supporting periphery of the saw. Accordingly, a saw having three concentric sections between two step tapers is disclosed. A first step taper from the central concentric hub member is present where the saw extends into the kerf. A second step taper is located between the central concentric hub member and the peripheral supporting teeth. Between these respective step tapers are defined sections of the saw of decreasing thickness. These sections of the integrally formed saw can be described as a thick central hub member, the thinner medial concentric member extending into the kerf and the thinnest peripheral concentric member supporting the teeth.

An advantage of this invention is that the step taper between the hub and supported peripheral teeth elevates natural frequencies and associated critical speeds, especially those of the lower order modes. Such elevation of the natural frequencies is especially prominent in the so-called second nodal vibration mode, a frequency that is not appreciably elevated by the prior art techniques of symmetrical prestressing. There results an improved margin between the second mode natural frequency of the rotating saw and its rotation frequency. Accordingly, a thin saw can operate at higher speeds while maintaining linearity of cut.

A further advantage is that like the prior art, the saw can be stressed by cold rolling in or other means. In such stressing the thick central hub member improves the critical modes of vibration, especially in the so-called zero mode. In such zero mode (or dishing mode), the compressive radial stresses within the body of the saw cause the saw to naturally bend to a concave configuration.

Yet another advantage of this invention is that the location of the step taper can be changed radially with respect to the diameter of the saw. This enables individual saws to be tuned for specific applications. With the use of computer technology, movement of the step taper within the kerf can occur with the saw responding with elevated critical frequencies in the various modes of vibration. The reader should understood that as a general case, the second step taper should be extended toward the tooth mounting portion of the saw. This extension will be limited by excessive rubbing at the step taper against the sides of the kerf.

An additional advantage of this invention is that the critical vibrational operating improvement of the saw is independent of the particular system used for driving the saw. A saw can be utilized with a splined saw shaft. On such a splined shaft, the saw is not fixed to the shaft. The saw is located on the shaft by a system of guides which constrain the sideways motion of the saw disk. Alternately, either clamped collar supports or a floating collar support can be used with the disclosed design.

BRIEF DESCRIPTION OF THE DRAWINGS

Other objects, features, and advantages will become more apparent after referring to the following specification and attached drawings in which:

FIG. 1 is a perspective view of a saw of the preferred embodiment, the saw here being shown with a splined free floating support cutting a piece of lumber, the piece of lumber being shown broken away so that the kerf left in the path of the saw can be seen and understood;

FIGS. 2A-2D are cross sections of certain prior art saws;

FIGS. 3A-3E are cross sections of the circular saw designs incorporating this invention.

FIG. 4 includes two side-by-side graphic plots illustrating the increase in vibration tolerance induced by the design of this invention over a conventional tapered design;

FIG. 5 compares the frequency margin of a saw having a taper to the two step taper design of this invention; and, FIG. 6 compares the frequency margin of a saw having a constant thickness with the two step taper design of this disclosure.

Referring to FIG. 1 a saw S is illustrated. Typically, saw S rotates on a spindle shaft 14, the shaft being driven conventionally by a motor not shown.

The reader will understand that for the purposes of this patent application only one saw S is shown on shaft 14. It will be understood that more often than not, many saws S are utilized.

Saw S is an integral construction. This integral construction can be divided into three concentric components. These three concentric components include an inner and thick central concentric hub member 16, an intermediate concentric and thinner member 18 and a peripheral concentric member and thinnest member 20. These respective members are integral to one another. That is to say they are formed from the same piece of material.

Typically the members are connected by step tapers. These step tapers include fairly abrupt tapered or curved sections; it is preferred that the discontinuities of the step tapers are relieved so as not to impart cracking to the saw. Taking the case of saw S in FIG. 1, a first step taper 17 delimits hub 16 from intermediate concentric member 18. Likewise, a second step taper 19 delimits intermediate member 18 from peripheral member 20.

Typically, affixed to the periphery of the saw by well known welding or brazing processes are carbide teeth 22. The reader will understand that although carbide is frequently used, the teeth can be of any suitable material, including the steel of the saw itself. These teeth 22 can be seen creating a kerf in a piece of lumber being sawn. Such a piece of lumber is schematically illustrated in the section of FIG. 3A.

Typically, each saw blade on a spindled shaft is held in place between respective guides, not shown. Such an embodiment is illustrated herein. It will be understood that this invention is equally applicable to a centrally clamped saw.

Referring to FIG. 3A it can be seen that central hub member 16 is illustrated. This central hub member terminates at a first step taper 17 constituting a half round portion.

The second intermediate concentric member 18 extends between step tapers 17 and 19. Finally, peripheral member 20 is present. This peripheral member 20 supports teeth 22 on the edge of the saw.

It can be seen that the thickness of both intermediate concentric member 18 and peripheral concentric member 20 are less than that of the path of cut in the lumber of the saw. This is typically defined by a slot known as the kerf K of the saw.

Some exemplary dimensions can be of assistance.

Taking the case of a standard 20 inch diameter saw utilized in modern production lumber mills, the central member typically has a diameter of 8 inches and a thickness in the order of 0.130 inches. Typically the intermediate concentric member has a diameter of 14 inches and a thickness in the order 0.050 inches. Finally, the peripheral supporting member has a diameter of 20 inches and a thickness in the range of 0.040 inches.

In such a saw typically the teeth have a width in the range of 0.060 to 0.075 inches. It is preferred that the periphery of the saw be subject to circumferential hoop/prestressing.

The configuration of the step tapers 17, 19 is conventional. Typically these tapers are sufficiently rounded so as not to induce saw cracking at the discontinuities. At the same time, the tapers are abrupt so as to span the two thickness discontinuities in the otherwise integral metal piece of the saw.

Having set forth the preferred embodiment of the invention, it is convenient to review and distinguish the prior art.

Referring to FIG. 2A a saw with a thick central hub is shown with the more conventional gradual taper. A thick central hub 26 and a gradually tapering member 28 extends from a step taper 29 to and towards the supported saw teeth 22. This type of saw does not include the improved resistance to critical vibrations, especially in the zero through fourth modes, induced by the step taper within the kerf.

Referring to FIG. 2B a central hub member 26 with a radially extending member 38 of constant thickness extends to the teeth 22.

In FIG. 2C is shown a saw of the prior art. Typically, the hub member 26 includes a step taper 29 on one side only. Step taper 29 then continues in a section of constant thickness to a member 48 supporting the teeth 22.

Referring to FIG. 2D a central hub member including first and second step tapers 56, 58 is shown. Again a member of constant thickness 48 extends to support the teeth 22.

A thickened central hub is required for the practice of my invention. I have found that the thickened central hub member 16, cooperates with the radial or circumferential stressing of the saw. Specifically, and by placing the outer radial portion of the saw under hoop tension from cold rolling, radially compressive stresses are exerted inwardly from the periphery of the saw to and towards the center. If the saw is not given sufficient section at the center, the saw will bend in a so-called "zero" nodal mode. Typically, the saw has a tendency to become, or in fact becomes, concave. I have found that the thickened central hub resists this tendency. In the resistance of this tendency, the thickened central hub uniquely cooperates with the remainder of the saw to provide my improved vibrational resistance.

Having set forth the prior art, variations of the present design can be illustrated with respect to FIGS. 3B-3E.

Referring to FIG. 3B a design similar to that of FIG. 3A is shown. Here, however, the central hub 16' has been modified. It includes a single step taper 17' on one side and a flat surface 27 on the opposite side. By having the thickened central hub with the paired step tapers 19, the design of my invention is practiced.

Likewise referring to FIG. 3C a modification of the intermediate concentric portion 18 and the peripheral concentric member 20'. Specifically, both of these members are shown with a taper. Either one or the other of these members can be provided with a taper.

Referring to FIG. 3D a central hub 16 and a peripheral member 20 includes a modified intermediate concentric member 18–. Modified concentric member 18" has a narrow section adjacent the first step taper 17 and an expanded section adjacent the second step taper 19. This taper which can exist on either concentric portion 18, 20, constitute another modification of my design.

FIG. 3E illustrates the case that absolute radial symmetry between the respective step tapers is not required. For example, a step taper 19 on one side of the saw can include a nearby and radially noncoincident step taper 30 on the opposite side of the saw. As before, the central radial hub 16 is illustrated.

I have illustrated the case here where one step taper 19 is placed in the kerf portion of the saw. It will be understood that my invention can include more than one step taper in the kerf portion of the saw.

First, it is instructive to compare the vibration modes of the preferred embodiment with alternative designs. Assuming a statically clamped saw body conventionally excited by an impact, the applicable vibrations can be summarized in the following:

TABLE I

| | STATIC NATURAL FREQUENCIES, UNTENSIONED (HZ) 207.6 MM DIAMETER SAW VIBRATION MODE | | | | | | |
|---|---|---|---|---|---|---|---|
| DIMENSIONS IN MM. | 0.0 | 0.1 | 0.2 | 0.3 | 0.4 | 0.5 | 0.6 |
| Uniform thickness .838 thick clamp rad. 134.1 | 127 | 129 | 137 | 153 | 181 | 221 | 275 |
| Hub 3.073 thick uniform .838th from 134.1 rad. clamp rad. 127.0 | 157 | 159 | 168 | 185 | 212 | 251 | 302 |
| Hub 3.073 thick taper 1.194 at 134.1 rad. to .838th clamp rad. 127.0 | 184 | 192 | 200 | 220 | 243 | 272 | 352 |
| Hub 3.073 thick two steps: 1.194th from 134.1 rad., clamp rad. 127.0 .838th from 165.0 rad. | 197 | 201 | 207 | 224 | 245 | 270 | 320 |
| .838th from 175.0 rad. | 208 | 212 | 220 | 239 | 267 | 303 | 351 |

It will be seen that over a uniform thickness saw, an improvement in the second vibrational mode from 137 Hz to 220 Hz results. This margin represents not only an improvement in the case of static vibration, but additionally represents improved performance against other forces acting on the saw that will degrade performance and hence induce vibration. For example, the saw will have improved margin against the heating of the saw with the eventual inducing of the undesired vibration properties.

It can be seen that the closest performance in saw characteristics comes from the single taper from the thickened central hub member to the saw periphery. Consequently, it is instructive to graph the vibrational performance of the two designs when both are subjected to roller tensioning strain. Such a comparison graphing is illustrated in FIG. 4.

Referring to FIG. 4 it can be seen for roller tensioning plastic strain induced in the range of about −0.0125 mm/mm, resonant vibration in the second mode (2) of vibration occurs at about 145 cps. Resonance of the taper design occurs at approximately 130 cps.

It will be understood that there is defined below all of the curves for the respective modes certain safe boundaries for saw disc operation. This can generally be delineated as an "area" of margin wherein safe saw operation can occur. The larger this area of safe operation becomes, the greater flexibility the particular saw design incorporates against destabilizing vibration. In the instant comparison of FIG. 4, the 80 cps boundary has been emphasized for this comparison. The area defined about this boundary by the preferred embodiment clearly exceeds that of the taper design of the prior art.

Referring to FIG. 5 the maximum frequency margin is compared against a saw having a constant taper from the central hub member to the supported teeth. Specifically, two points of transition of the taper are compared to rim thickness required for equivalent performance of the tapered design. It can be seen that the design of the preferred embodiment will support a rim thickness of 0.033 inches whereas the two tapered embodiments require additional rim thickness. For example assuming that the preferred designs have the transition at 165 mm radius from the hub of the saw, a taper equivalent saw must have a rim thickness in the range of 0.035 inches. Assuming that the preferred design have the transition at 172 mm radius, a taper equivalent saw must have a rim thickness in the range of 0.038 inches. It will be understood that the taper dimension generally follow those dimensions set forth in FIG. 4.

Comparison of the preferred design to a conventional saw of uniform thickness is even more startling. Referring to FIG. 6 it can be seen that the preferred design having a transition at 165 mm radius is the equivalent of a saw having 0.055 inches thickness (as contrasted to 0.033 inches for the tooth support structure of the preferred design). Similarly, a transition at 172 mm radius is the equivalent of a saw having 0.059 inches thickness (as contrasted to 0.033 inches for the tooth support structure of the preferred design). When it is remembered that the excess thickness adjacent to the tooth support structure requires a wider kerf and increased waste, the significance of the reduction in the dimension of saw design adjacent the tooth support surface can fully be appreciated.

I have shown the saw disk material to be steel, the preferred material used by those practicing the art today. The design described would also benefit the vibration characteristics of saws made from other materials.

I claim:

1. A circular saw having peripheral teeth for rotating on a spindle and cutting a kerf at said teeth into a workpiece being sawn, said saw comprising:
    a unitary piece construction having;
    a thick concentric central hub member configured about said central spindle and extending towards but not into the kerf of said saw;
    a thinner intermediate concentric member configured about said concentric hub member and extending into said kerf to a point of termination at a circumfernetially disposed step taper;
    a step taper on both sides of said saw terminating the periphery of said thinner intermediate concentric member;
    a thinnest and peripheral exterior concentric member commencing at said step taper and extending to supported peripheral teeth having the width of said kerf, said supported peripheral teeth being wider than said intermediate concentric member and said peripheral exterior concentric member whereby said saw cuts a kerf exceeding its dimension beyond said central hub into a piece of lumber being sawn.

2. The invention of claim 1 and wherein said thick concentric central hub member includes a thickness greater than the thickness of said kerf.

3. The invention of claim 1 and wherein said step taper is configured symmetrically on both sides of said saw.

4. The invention of claim 1 and wherein said saw is prestressed.

5. The invention of claim 4 and wherein said thinner intermediate concentric member and said thinnest and peripheral exterior concentric member are tapered.

* * * * *